United States Patent [19]

Hawkins

[11] Patent Number: 5,388,865
[45] Date of Patent: Feb. 14, 1995

[54] PRESSURE REGULATOR VENT PIPING COUPLER

[75] Inventor: James C. Hawkins, Allen, Tex.

[73] Assignee: Fisher Controls International, Inc., Clayton, Mo.

[21] Appl. No.: 161,804

[22] Filed: Dec. 6, 1993

[51] Int. Cl.$^6$ ............................................. F16L 15/08
[52] U.S. Cl. .................................... 285/89; 285/92; 285/175; 285/340; 285/179
[58] Field of Search ................. 285/89, 321, 184, 340, 285/92, 175, 179

[56] References Cited

U.S. PATENT DOCUMENTS

| | | | |
|---|---|---|---|
| 4,030,798 | 6/1977 | Paoli | 285/89 X |
| 4,062,574 | 12/1977 | Scholin | 285/340 |
| 4,084,843 | 4/1978 | Gassert | 235/340 X |
| 4,927,188 | 5/1990 | Sands | 285/89 |

FOREIGN PATENT DOCUMENTS 2155576  9/1985  United Kingdom ............... 285/340

OTHER PUBLICATIONS

Drawing of Vent Extender, Bryan Donkin Company, Canada, 1992.

*Primary Examiner*—Dave W. Arola
*Attorney, Agent, or Firm*—Marshall, O'Toole, Gerstein, Murray & Borun

[57] ABSTRACT

A vent piping coupler for coupling vent piping to a threaded vent outlet of a pressure regulator or other venting device to vent the device vent outlet to a remote location. A coupler body with a first threaded section for threadably mounting into the vent outlet, a locking ring with projecting tabs to grip into the vent outlet, and a lock nut threadably mounts to a second threaded section on the coupler body which includes a slot. The lock ring has an anti-rotation tab engaged in the slot to lock the coupler body in position on the vent outlet when the lock nut is tightened. A grip ring with inwardly angled teeth is crimp mounted at the other coupler body end to insertably receive a vent piping which is locked in position by the angled teeth. Respective O-rings may be used to seal the coupler body to the vent outlet and to the vent piping.

8 Claims, 1 Drawing Sheet

PRESSURE REGULATOR VENT PIPING COUPLER

This invention relates to venting devices and in particular to remote venting devices for relocating a pressure regulator vent output.

BACKGROUND OF THE INVENTION

At times it is desired to utilize venting apparatus, such as vent piping, to relocate the vent output of a device from one particular area to another, such as a remote location. One example of such usage is in connection with pressure regulators used in fluid pipeline systems, such as gas pressure regulators in a natural gas pipeline system.

In such systems, remote venting devices are used when it is desired and necessary to relocate the vent output of a pressure regulator to an area protected from outside influences, such as adverse weather conditions, or to exhaust a regulator's vented gas to an isolated area, or for other purposes. It is therefore desired that the vent piping and any associated couplers for coupling the piping to the pressure regulator should be securely locked in place to prevent actions which could result in making the venting apparatus ineffective. At the same time, it is desired that such venting apparatus should be easily installed. However, often such apparatus requires field installation at a pressure regulator which in many instances occurs in hard-to-reach places making installation difficult. It is further desired to provide the installation of the venting apparatus with a minimum of tools.

In a commercially available vent extending apparatus for a pressure regulator, an aluminum vent pipe extender is connected to the gas regulator vent outlet by means of a plastic threaded coupling which is loosely captured at one end of the vent extender. The vent pipe extender is mounted to the gas regulator vent by threadably engaging the plastic coupling onto the threaded regulator vent outlet. Three set screws threadably engage the plastic coupling and extend through the coupling so that the set screw ends engage the outside surface of the vent pipe. The set screws are then tightened into the metal vent extender so as to prevent rotation of the vent extender with respect to the regulator vent outlet. Respective O-rings are provided between the threaded portions of the plastic coupling and a ventilator outlet and between the outer surface of the vent pipe and the inner diameter of the plastic coupling.

It has been found in practice in utilizing this commercial venting device that if the set screws are tightened too much into the metal vent piping, then this action tends to loosen the threadable engagement of the plastic coupling from the regulator vent outlet which also thereby loosens the clamp on the O-ring seal. Such undesirable action enables the regulator vent gas to escape at the regulator vent outlet, thereby defeating the intended purpose of the venting apparatus. Furthermore, this device does not securely lock the position of the venting pipe with respect to the vent outlet, so that in practice one can readily rotate or move and thereby undesirably relocate the vent piping.

SUMMARY OF THE INVENTION

In accordance with the principles of the present invention, there is provided venting apparatus to provide remote venting in a reliable manner and which can be readily installed in place. In particular, there is provided venting apparatus to facilitate remote vent piping of a pressure regulator that incorporates: (1) a positive locking device to prevent the accidental rotation, relocation or removal of the vent piping; and (2) a push-in vent pipe installation structure to provide a tamper-resistant pipe engagement requiring no tools for installation. Thus, the present invention is particularly useful for but is not limited to remote venting apparatus which is mounted on pressure regulators for the purpose of relocating the regulator vent output to a protected area.

In accordance with one aspect of the present invention, there is provided a vent piping coupler for coupling vent piping to a threaded pressure regulator vent outlet, the coupler including a coupler body with a threaded end for threadably engaging the threaded pressure regulator vent outlet. The coupler body also includes an opposite vent piping end for mounting to the vent piping. A locking ring mounted on the coupler body includes gripping tabs securely engagable into the threaded pressure regulator vent outlet to lock the coupler body in position and further includes at least one anti-rotation tab to engage a slot in the coupler body to aid in locking the coupler body in place. A threaded lock nut threadably engages a second set of threads on the coupler body. Tightening of the lock nut securely engages the locking ring to securely lock the locking ring and coupler body in a desired position on the regulator vent outlet.

A grip ring is inserted into the coupler body vent piping end and is locked in position by crimping metal at the vent piping outlet so as to surround the grip ring and lock it in its position. The grip ring also includes a series of teeth angled inwardly to enable easy insertion of the vent piping and to securely grip the piping exterior surface to prevent removal of the piping.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

DETAILED DESCRIPTION

Figure 1:
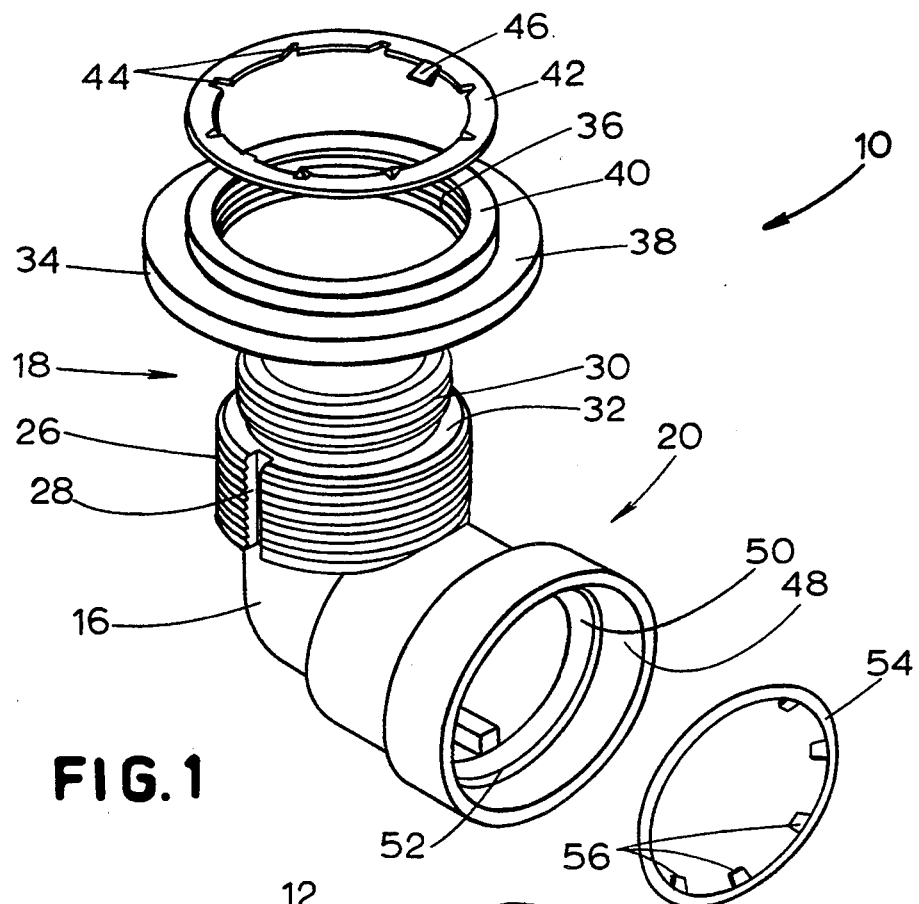
FIG. 1 is an exploded perspective view illustrating a preferred embodiment of the vent piping coupler in accordance with the present invention.
Figure 2:
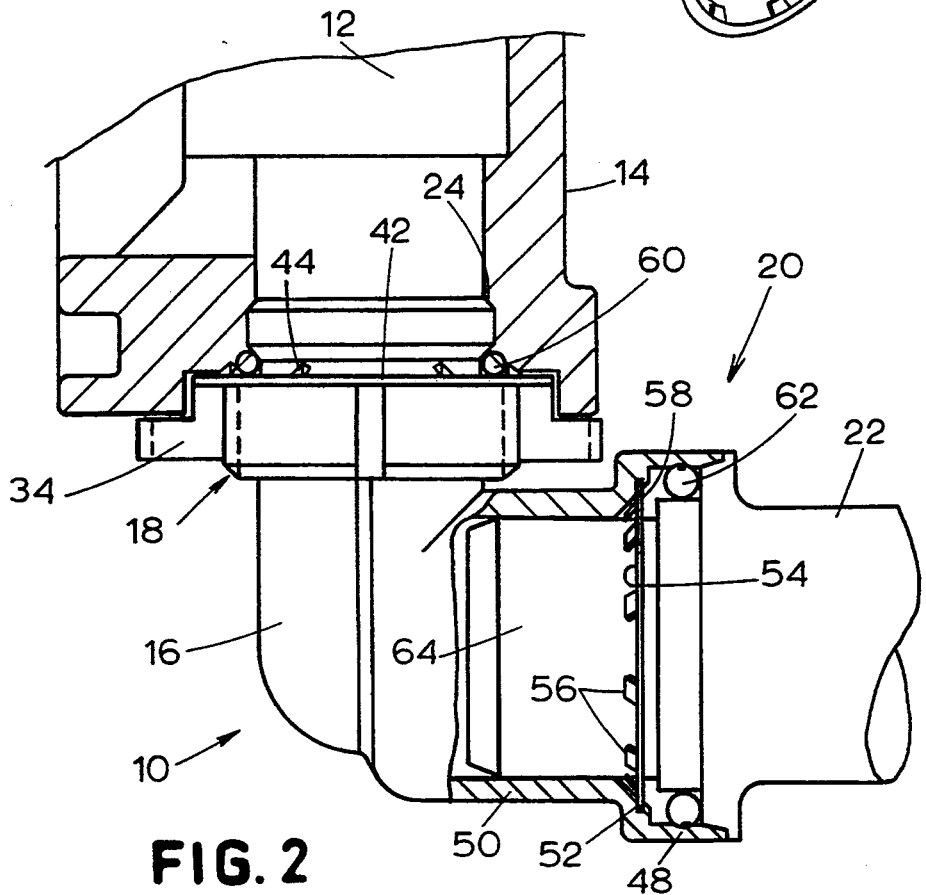
FIG. 2 is a fragmented elevational view partly in section illustrating the vent piping coupler of FIG. 1 in a pressure regulator vent outlet.

Referring now to FIGS. 1 and 2, there is illustrated a venting apparatus including a vent piping coupler 10. It is to be understood that while the present invention is illustrated with the preferred embodiment of this invention for use with a pressure regulator 12 having a pressure regulator vent outlet 14, the invention is not limited to pressure regulators, as the coupler 10 can be utilized with any vent outlet of a device wherein the vent is to be relocated to another area.

The coupler 10 includes a coupler body 16 with a threaded end 18 for connection to the pressure regulator vent outlet 14 and an opposite vent piping end 20 for connection to a vent piping extender 22. The vent piping extender 22 will extend the venting from the outlet 14 of the pressure regulator 12 to a desired remote location.

Within the interior of the regulator vent outlet 14 there is provided a threaded section 24. The coupler body 16 includes at the threaded end 18 a first threaded section 26 formed with a slot 28 and a second threaded section 30. As can be seen from FIG. 1, the threaded section 30 has a smaller diameter than the threaded section 26 and is separated therefrom by a shoulder 32. Also, the threaded section 30 is adapted to threadably engage with the threaded section 24 within the interior of the vent outlet 14.

The vent piping coupler 10 also includes a lock nut 34 formed with interior threads 36 and including a base portion 38 and a stepped portion 40 projecting from the base portion 38. The lock nut inner threads 36 are adapted to threadably engage the threaded section 26 of the coupler end 18.

A locking ring 42 includes a series of gripping tabs 44 formed as crimped-upstanding tabs spaced around the inside diameter of the locking ring. The locking ring 42 further includes an anti-rotation tab 46. The gripping tabs 44 are formed and sized so as to embed into the material within the interior of the vent outlet 14 during installation of the coupler 10. The anti-rotation tab 46 is adapted to slidably fit within the slot 28 in the threaded section 26 of the coupler end 18 as the ring 42 sits on the stepped portion 40.

The vent piping end 20 is formed with a flared out section 48 extending from the main section 50 of the coupler body 16. A recess 52 is formed at the junction of main section 50 and flared section 48 to accommodate a grip ring 54 having a series of inwardly projecting teeth 56 at the inner diameter of ring 54. A series of displaced metal sections 58 formed by crimping metal inside the flared section 48 can be made to extend over the gripping ring 54 so as to maintain the ring permanently mounted in position on the recess 52 between the main section 50 and the flared section 48. As an alternative fastening means, a threaded fastener or a drive pin inserted through the flared section 48, or a retaining clip can be used to maintain the grip ring 54 mounted within the coupler vent piping end 20. As can be seen in FIG. 2, the grip ring 54 is mounted on the coupling vent piping end 20 so that the inwardly projecting teeth 56 are angled inwardly towards the coupler body 16.

An O-ring 60 is provided at shoulder 32 for sealing the coupler threads 30 at the interior wall of the pressure regulator vent outlet 14. An O-ring 62 is provided adjacent the flared section 48 and the vent piping 22.

Installation of the vent piping coupler 10 and the vent piping 22 onto the pressure regulator vent outlet 14 of the pressure regulator 12 is accomplished in the following manner. The lock nut 34 is threadably engaged onto the threaded section 26 at the coupler end 18 until the lock nut is substantially at the bottom end of the threads. The locking ring 42 is placed on the threaded section 26 with the anti-rotation tab 46 engaged within the slot 28. If used, O-ring 60 is placed on the shoulder 32.

The vent piping coupler 10 is now mounted onto the pressure regulator by threading the threaded section 30 of coupler end 18 into the threaded section 24 of the vent outlet 14. The coupler 10 is continued to be threaded into the vent outlet until the O-ring 60 is seated and the coupler is properly positioned with respect to the desired position of the vent piping 22. Next, the lock nut 34 is turned to raise the locking ring 42 and force the gripping tabs 44 to embed into the material around the interior of the regulator vent outlet 14.

With the gripping tabs 44 firmly embedded into the regulator vent outlet 14, and the anti-rotation tab 46 engaged in the slot 28 of the coupler 10, the coupler is locked firmly in place. With the coupler installed, the end 64 of the vent piping 22 is inserted into the opening of the coupler 10 at the flared section 48 and through the grip ring 54 so as to thereby engage the teeth 56. Because the grip ring teeth 56 are angled inward as shown in FIG. 2, this enables the vent piping 22 to be inserted into the coupler 10 while the teeth 56 securely grip the piping 22 exterior surface and prevent removal of the piping. Accordingly, the coupler of the present invention enables a tamper resistant installation with no tools required while securely locking the orientation of the coupler and providing a means for easy field installation of the vent piping, also without any tools required.

The vent piping coupler 10 is illustrated herein for use in environmental conditions where an O-ring is desirable, such as to prevent moisture infiltration or ice formation. If there are no severe environmental conditions, one can eliminate either one or both of the O-rings 60, 62. Similarly, instead of the O-ring 60, in certain conditions a thread sealing compound forms a sufficient seal. Furthermore, whereas the present illustration of the invention is with respect to a coupler body 16 in the shape of a right angled elbow, it is to be understood that a straight coupler or any other angled coupler can be provided in accordance with the present invention.

The foregoing detailed description has been given for clearness of understanding only, and no unnecessary limitations should be understood therefrom, as modifications will be obvious to those skilled in the art.

What is claimed is:

1. A vent piping coupler for coupling vent piping to a threaded vent outlet, said coupler comprising:
   a coupler body including a threaded end for threadably engaging said threaded vent outlet and an opposite vent piping end for mounting to said vent piping;
   locking ring means for locking said coupler body in position;
   said locking ring means including a locking ring mounted on said threaded end including a plurality of upstanding tabs spaced around said locking ring and adapted to securely embed into said threaded vent outlet and a threaded lock nut threadably mounted on said coupler body threaded end to urge said upstanding tabs into secure embedment into said threaded vent outlet; and
   a grip ring mounted within said vent piping end, said grip ring having teeth projecting inwardly from the perimeter of said grip ring and adapted for insertably receiving said vent piping while tending to prevent removal thereof.

2. A vent piping coupler according to claim 1, said coupler body threaded end including a slotted threaded portion and said locking ring engaged in said slotted threaded portion with said threaded lock nut threadably mounted on said slotted threaded portion.

3. A vent piping coupler according to claim 2, wherein said locking ring includes an anti-rotation tab projecting from said ring and adapted to engage said slotted threaded portion to aid in locking said coupler body in position with respect to said vent outlet.

4. A vent piping coupler according to claim 2, including an O-ring mounted between said coupler body threaded end and said vent outlet.

5. A vent piping coupler according to claim 1, wherein said grip ring is crimp mounted in said coupler body vent piping end.

6. A vent piping coupler according to claim 5, wherein said grip ring teeth angle inwardly toward said coupler body with said grip ring mounted in said coupler body vent piping end.

7. A vent piping coupler for coupling vent piping to a threaded pressure regulator vent outlet, said coupler comprising:

a coupler body including a threaded end for threadably engaging said threaded pressure regulator vent outlet and an opposite vent piping end for mounting to said vent piping;

a locking ring including tabs projecting from said locking ring and adapted for secure embedding engagement into said threaded pressure regulator vent outlet for locking said coupler body in position;

said locking ring including a threaded lock nut, said coupler body threaded end further including a slotted threaded portion, and said lock nut threadably mounted thereon adjacent said locking ring to urge said tabs into secure embedded engagement into said threaded pressure regulator vent outlet thereby locking said coupler body into said vent outlet; and a grip ring mounted within said vent piping end, said grip ring having teeth projecting inwardly from the perimeter of said grip ring and adapted for insertably receiving said vent piping while tending to prevent removal thereof.

8. A vent piping coupler according to claim 8, wherein said locking ring further includes an anti-rotation tab engaged within said slotted threaded portion for preventing rotation of said coupler body with respect to said pressure regulator vent outlet.

* * * * *

UNITED STATES PATENT AND TRADEMARK OFFICE
CERTIFICATE OF CORRECTION

PATENT NO. : 5,388,865
DATED : February 14, 1995
INVENTOR(S) : James C. Hawkins

It is certified that error appears in the above-identified patent and that said Letters Patent is hereby corrected as shown below:

Col. 6, line 16, change "8" to --7--.

Signed and Sealed this

Seventh Day of May, 1996

Attest:

BRUCE LEHMAN

Attesting Officer     Commissioner of Patents and Trademarks